April 25, 1967
H. ELLINGTON
3,315,794
CLEANING APPARATUS
Filed April 27, 1965
2 Sheets-Sheet 1
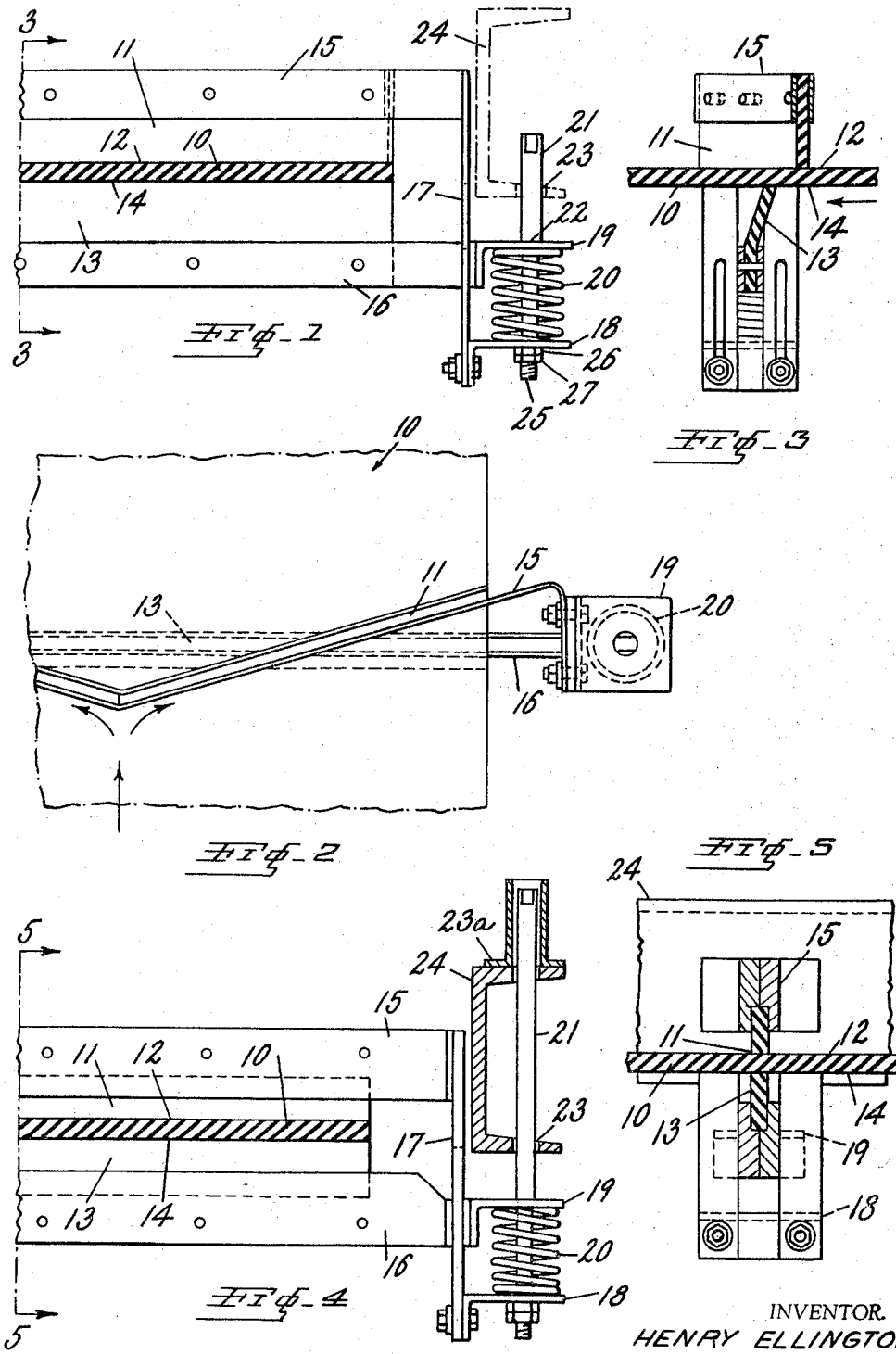
INVENTOR.
HENRY ELLINGTON
BY James R. Hulen
ATTORNEY

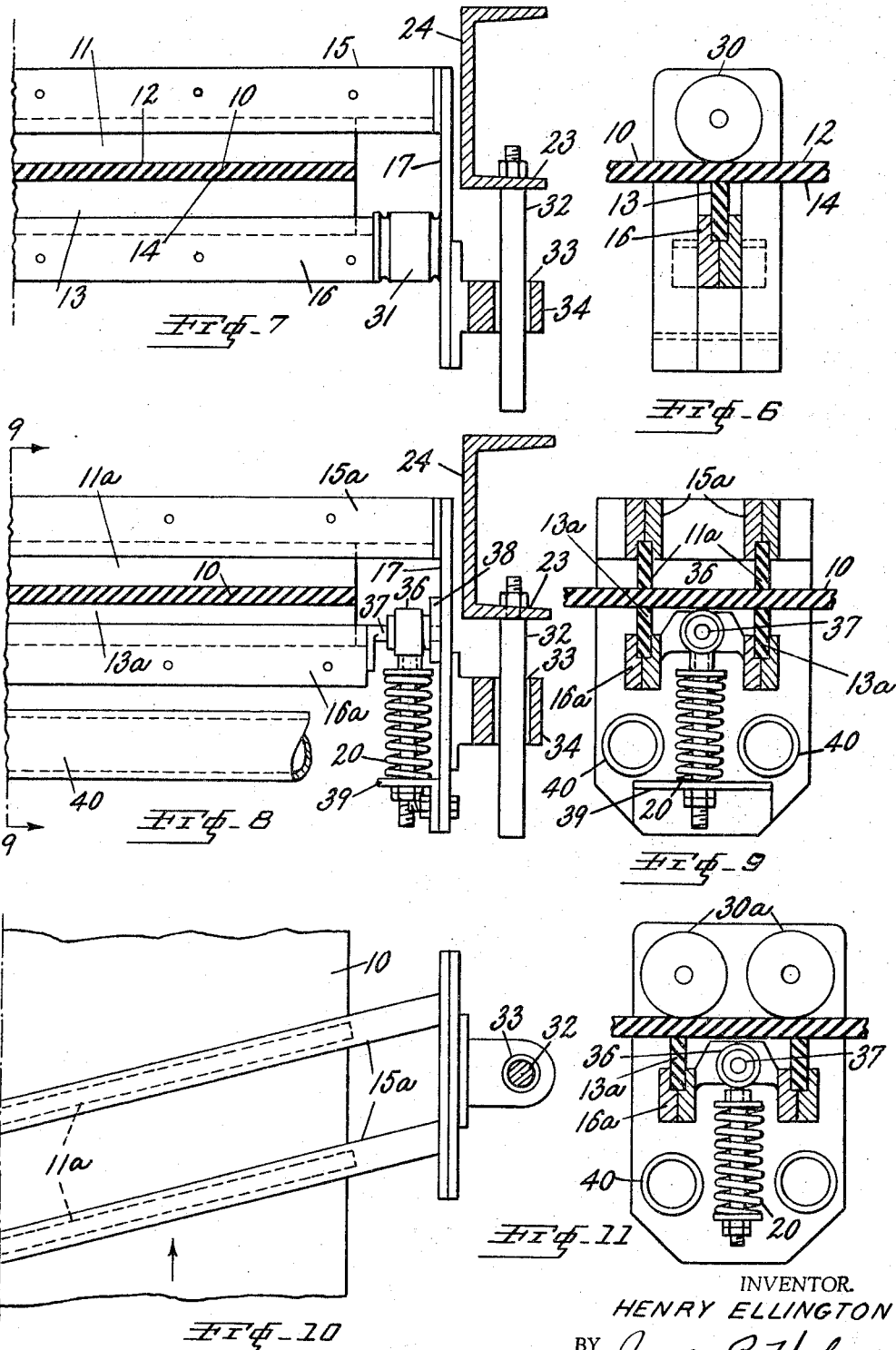

United States Patent Office 3,315,794
Patented Apr. 25, 1967

3,315,794
CLEANING APPARATUS
Henry Ellington, Heathhall, Dumfries, Scotland, assignor to The North British Rubber Company Limited, Edinburgh, Scotland, a corporation of Scotland
Filed Apr. 27, 1965, Ser. No. 451,120
14 Claims. (Cl. 198—230)

The present invention relates to conveyor belt cleaning apparatus.

At the present time the cleaning of the opposite sides of a conveyor belt is effected by spaced elements positioned on the return run of the belt. The cleaning of the conveying side is usually achieved by urging a rubber or steel blade, or bristles, against the belt surface by means of weighted and hinged lever arms, which arrangement suffers from the disadvantage that due to the load which is applied on the cleaning element, it is necessary to locate same on a tight portion of the belt, or adjacent a position where the belt contacts a delivery or snub pulley. The pulley side of the belt is usually cleaned by a V-shaped plough member which is hinged to the conveyor support structure and rests on the belt under its own weight.

With these known cleaning devices considerable difficulty has been experienced in removing materials which tend to cling to the surfaces of the belt and thus produce faulty belt tracking.

The object of the present invention is to provide a conveyor belt cleaning apparatus which overcomes the disadvantages referred to above.

The present invention consists in a conveyor belt cleaning apparatus comprising upper and lower members at least one of which is a belt cleaning member, positioned in superposed relationship and adapted to be resiliently urged into contact with the pulley engaging and conveying surfaces of the belt, respectively.

Preferably, the cleaning members comprise bladed elements formed from solid urethane rubber.

In the accompanying drawings:

FIGURE 1 is a front elevation of the belt cleaning apparatus according to the present invention, FIGURE 2 is a plan view of the apparatus shown in FIGURE 1, FIGURE 3 is a cross-sectional view taken on the line 3—3 of FIGURE 1, FIGURE 4 is a front elevation of a modified belt cleaning apparatus, FIGURE 5 is a cross-section view taken on the line 5—5 of FIGURE 4, FIGURE 6 is a cross-sectional view of the apparatus, similar to FIGURE 5 but showing a modified construction, FIGURE 7 is a front elevation of another modified construction of belt cleaning apparatus, FIGURE 8 is a front elevation of a further modified construction of belt cleaning apparatus, FIGURE 9 is a cross-sectional view taken on the line 9—9 of FIGURE 8, and FIGURE 10 is a plan view of the apparatus shown in FIGURE 8, FIGURE 11 is a cross-sectional view of the apparatus, similar to FIGURE 9 but showing a modified construction.

In carrying the invention into effect according to one convenient mode, as shown in FIGURES 1 to 3, the conveyor belt cleaning apparatus is positione don the return run of the belt 10 and comprises an upper bladed element 11 of V-shaped configuration which is urged into contact with the upper or pulley engaging surface 12 of the belt 10 and a lower straight bladed element 13 which is urged into contact with the lower or conveying surface of the belt 14.

The apex of the V-shaped upper element 11 faces the direction of belt travel and coincides with the center line of the belt 10 so that material removed from the surface is directed towards the sides of the belt. The upper portion of the lower element 13 is angled, preferably by 15° towards the direction of belt travel. Preferably, both bladed elements 11, 13 are formed from solid urethane rubber which has a low wear rate and can be compounded to provide the required blade rigidity, but if desired other materials such as natural or synthetic rubber, with or without fabric reinforcement, or polyvinyl chloride may be used.

The upper and lower cleaning elements 11, 13 are mounted respectively, in horizontally disposed support members 15, 16 which extend beyond each side of the belt 10. The extremities of the upper support member 15 are each provided with a vertically disposed member 17 which extends downwardly below the level of the lower support member 16. The lower end of each vertical member 17 has an outwardly directed platform 18 mounted thereon which is positioned below and coincident with a similar platform 19 mounted on the lower support member 16.

A compression spring 20 is positioned between each pair of platforms 18, 19 and it will be readily appreciated that the arrangement described above causes the bladed elements 11, 13 to be resiliently urged towards each other by equal and opposite forces.

Each pair of opposed platforms 18, 19 has a stepped stud 21 passing through the centres thereof with the stepped portion 22 engaging the upper surface of the platforms 19 associated with the lower support member 16. The larger diameter of each stud 21 extends upwardly and passes through an aperture 23 in the lower flange of a longitudinally extending channel-shaped member 24 forming part of the conveyor support structure, which arrangement maintains the belt cleaning apparatus in the required position relative to the conveyor belt.

The lower end of the smaller diameter of each stud 21 is provided with a screw-threaded portion 25 which extends downwardly below the platform 18 and has a nut 26 mounted thereon. Thus, upon tightening the nut 26 to compress the spring 20 any desired force can be obtained urging the cleaning elements 11, 13 towards each other. A lock nut 27 is positioned below the adjusting nut 26 to ensure the required spring pressure is maintained.

It will thus be seen that with the arrangement described above both sides 12, 14 of the conveyor belt 10 are cleaned simultaneously and the perpendicular forces exerted by by the blades 11, 13 are equal and opposite. It is therefore unnecesary to position the cleaning apparatus on a tight portion of the belt or at a location where the force exerted by the cleaner is supported by a drive or snub pulley. This permits the cleaning apparatus to be placed in any desired position on the return run of the belt where it is free from obstructions such as drive-gear or chutes. It will be readily appreciated that the apparatus will "float" with the belt as the sag between the supporting rollers on the return run alters due to varying tensions in the belt.

The embodiment of the invention shown in FIGURES 4 and 5 is similar to that described above and like reference numerals have been used to indicate like parts. In FIGURES 4 and 5 the stepped stud 21, in addition to passing through the aperture 23, also passes through an aperture 23a in the upper flange of the channel member 24, which increases the rigidity of the assembly. As shown in FIGURE 5, the lower cleaning element 13 is straight and does not have its upper portion angled as described with reference to FIGURE 3.

In FIGURE 6 the upper bladed element 11 shown in

FIGURE 5 is replaced by a roller 30 so that only the conveying surface 14 is cleaned during belt movement past the cleaning station. In all other respects the arrangement is identical with that shown in FIGURES 4 and 5.

In the embodiment shown in FIGURE 7 the upper and lower cleaning elements 11, 13 are mounted, respectively, in horizontally support members 15, 16 as described above in connection with the presvious embodiments. The ends of a rubber spring 31 are connected between the lower support member 16 and the vertical member 17 and the spring 31 is so positioned that when the belt 10 is passed between the cleaning elements 11, 13, a shear force is applied to the spring 31 which in turn applies equal and opposite forces to the cleaning elements 11, 13.

The member 17 is guided for vertical movement by means of a stud 32 rigidly connected to the lower flange 23 of the channel-shaped member 24, which stud 32 slidably engages an aperture 33 in a member 34 rigidly connected to the vertical member 17.

It will be readily appreciated that again, in this construction, the upper bladed element 11 may be replaced by a roller as described with reference to FIGURE 6.

In the modified construction shown in FIGURES 8 to 10, the upper and lower cleaning elements each include a pair of blades 11a and 13a respectively, mounted in support members 15a and 16a.

The lower support members 16a are interconnected by a yoke member 36 pivotally mounted on a shaft 37, the end of which is mounted for vertical sliding movement in spaced guides 38 connected to the vertical member 17. The compression spring 20 is positioned between the yoke member 36 and a platform 39 bolted on the vertical member 17. Spaced cross members 40 interconnect the opposite sldes of the assembly to give additional rigidity and strength.

The modified construction shown in FIGURE 11 is similar to that shown in FIGURE 10, except that the upper bladed elements have been replaced by spaced rollers 30a so that again only the conveying surface of the belt is cleaned as it moves through the cleaning station.

It will be readily seen that the coil or rubber spring arrangements described above may, if desired, be replaced by a torsion spring and lever arrangement.

Having thus described my invention, what I claim and desire to protect by Letters Patent is:

1. A conveyor belt cleaning apparatus comprising: upper and lower members positioned in superimposed relationship on opposite sides of the return run of said belt, at least one of said members being a belt cleaning member; resilient means interconnecting portions of said members for urging said members with an equal and opposite force into contact with said belt; and means for maintaining alignment between said belt cleaning apparatus and the conveyor support structure.

2. A conveyor belt cleaning apparatus as claimed in claim 1, wherein the upper and lower members each comprise a bladed belt-cleaning element.

3. A conveyor belt cleaning apparatus as claimed in claim 2, wherein the upper bladed element is of V-shaped configuration.

4. A conveyor belt cleaning apparatus as claimed in claim 1, wherein the upper member comprises a roller and the lower member forms the belt cleaning member.

5. A conveyor belt cleaning apparatus as claimed in claim 4, wherein the lower member comprises a bladed member, the upper portion of which is angled.

6. A conveyor belt cleaning apparatus as claimed in claim 1, wherein the upper and lower members are urged together by means of coil springs positioned therebetween.

7. A conveyor belt cleaning apparatus as claimed in claim 6, wherein each coil spring is interposed between upper and lower platforms, the upper platform being connected to the lower member and the lower platform connected to the upper member.

8. A conveyor belt cleaning apparatus as claimed in claim 7, wherein each pair of upper and lower platforms have a stepped guide stud passing through the centres thereof with the stepped portion engaging the upper surface of each upper platform, the stud passing through a guide aperture or apertures in a member forming part of the conveyor support structure.

9. A conveyor belt cleaning apparatus as claimed in claim 1, wherein the upper and lower members are urged together by a rubber shear spring.

10. A conveyor belt cleaning apparatus as claimed in claim 1, wherein the upper and lower members each comprise a pair of bladed belt cleaning elements.

11. A conveyor belt cleaning apparatus as claimed in claim 10, wherein the upper bladed elements are of V-shaped configuration.

12. A conveyor belt cleaning apparatus as claimed in claim 1, wherein the upper member comprises a pair of rollers and the lower member comprises a pair of bladed belt cleaning elements.

13. A conveyor belt cleaning apparatus as claimed in claim 1, wherein the lower pair of bladed elements are joined together by a pivotally mounted yoke member.

14. A conveyor belt cleaning apparatus as claimed in claim 13, wherein the upper and lower members are urged together by means of a coil spring interposed between said yoke member and a platform connected to the upper member.

References Cited by the Examiner

UNITED STATES PATENTS

| | | | |
|---|---|---|---|
| 1,543,411 | 6/1925 | Wittig | 198—230 X |
| 3,101,837 | 8/1963 | Martin | 198—230 |

FOREIGN PATENTS

| | | |
|---|---|---|
| 299,329 | 2/1929 | Great Britain. |
| 765,866 | 1/1957 | Great Britain. |

EVON C. BLUNK, *Primary Examiner.*

EDWARD A. SROKA, *Examiner.*